July 29, 1930.　　　　C. G. GARRARD　　　　1,771,534
AUTOMATIC OR OTHER NUT MAKING AND LIKE MACHINE TOOL
Filed July 15, 1927　　　2 Sheets-Sheet 1

INVENTOR
Charles George Garrard
BY
ATTORNEY

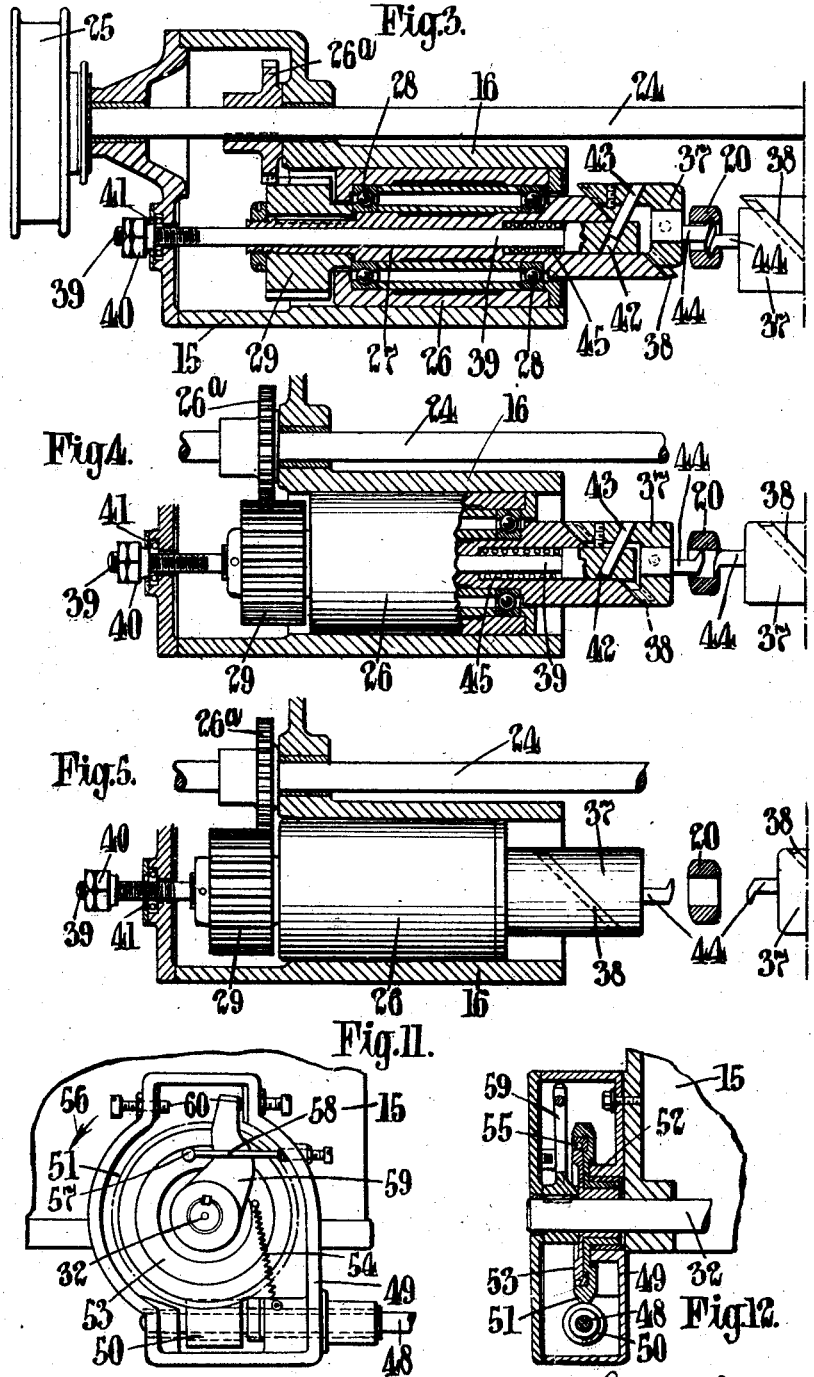

Patented July 29, 1930

1,771,534

UNITED STATES PATENT OFFICE

CHARLES GEORGE GARRARD, OF LONDON, ENGLAND, ASSIGNOR TO EVERTITE LOCK-NUTS LIMITED, OF LONDON, ENGLAND, A COMPANY OF GREAT BRITAIN

AUTOMATIC OR OTHER NUT-MAKING AND LIKE MACHINE TOOL

Application filed July 15, 1927, Serial No. 206,086, and in Great Britain December 4, 1926.

This invention relates to automatic and other machine tools and has for its object to provide an improved method of cutting a groove in a bore and improved machine tools by means of which an annular groove or recess of any desired section for example of V shape or substantial V shape in cross section, can be produced in an internal bore. It has for a further object to provide such an annular groove or recess in the bore of a nut blank or the like during the process of manufacture of the nut, and for a still further object to provide a machine tool by which nuts with an annular internal groove or recess of desired section, with one or both ends bevelled to constitute a self-locking nut can be produced from a bar of suitable section or from suitably shaped blanks.

In general automatic and other machine tools constructed according to the invention comprise means for holding a bored blank, divided off from a bar or separately inserted, and means for passing two separate tools into the bore from opposite ends and consequently in opposite directions, together with means for imparting to the tools cutting feeds in directions parallel to the sides of the V or other grooves to be produced, in such a manner that one tool cuts one surface of the V or other groove whilst the other tool cuts the other surface, the tools being so shaped, proportioned and arranged that their combined actions produce the complete groove. The bored blank is preferably held in a fixed position whilst the tools rotate to perform their cutting operation, but in some cases the tools may be held fixed and the blank rotated, or where desired both the tools and the blank may be rotated and preferably in opposite directions. The tools are spaced a desired angular distance apart, and to give a maximum clearance this angular distance is preferably 180 degrees.

In order that the invention may be better understood it will now be described with reference to the accompanying drawings in which:—

Fig. 3 shows fragmentary sectional plan on the line 3—3 Fig. 2 to an enlarged scale with the parts in one position.

Figs. 4 and 5 show substantially similar views to Fig. 3 but with the parts in other positions.

Fig. 11 shows in rear elevation and Fig. 12 in sectional elevation, a device forming an integral part of the machine shown in Figs. 1 and 2 for preventing excessive feed of the tools.

Figure 1:
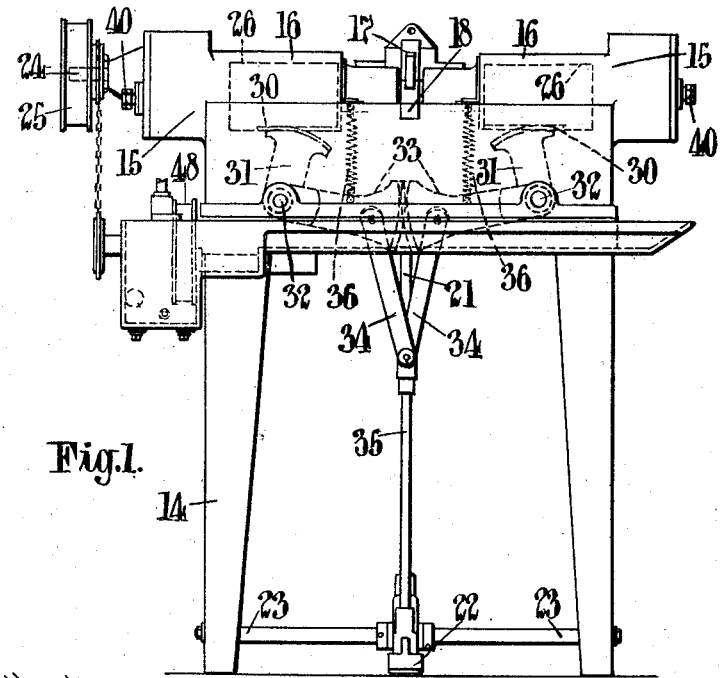
Fig. 1 shows a front elevation of one form of machine constructed according to the invention for forming annular V grooves in the internal bores of nut blanks, each blank being separately inserted and removed.

In automatic and other machine tools as previously constructed, internal recessing has been done by tools the shape of which fixes the shape of the recess to be made. The great disadvantage of this method is that a long cutting edge for the tool is entailed. Owing to the strain set up by this long cutting edge and the necessarily small section of the shank of the tool, the tool is weak in construction and consequently frequent breakage and loss occur. Recessing tools and automatic and other machine tools constructed according to the invention are designed to overcome this drawback.

In the drawings, a hand-fed and pedal operated machine is shown. Bored nut blanks are placed in the machine and withdrawn by hand and the pedal operation causes the nut to be gripped in position and the recessing tools to be brought into operation to form the groove.

As hereinbefore indicated, two tools are employed operating at 180 degrees apart, that is at opposite sides of the bore in which the recess is to be cut. These two tools have feed motions parallel to the surfaces of the V or other groove imparted to them, one travelling at the angle for one side of the V or other groove and the second travelling at the same angle but in the opposite sense to form the opposite surface of the V or other groove, the two tools in the cutting of the V groove coming to a common apex at the extremity of their motion, which is the apex of the groove.

From the above it will be understood that the actual cutting edge of each tool need only be a very narrow edge at the extreme curved point and each tool can be cleared at the sides so that it does not rub on the surfaces of the V or other grooves whilst the groove is being formed. Owing to this extremely narrow cutting edge the shank of the tool is of adequate strength to withstand the strain of the cutting operation without fear of breakage.

The machine shown on the drawings comprises a cast or other stand 14 supported or formed integrally with a cast body or framework 15 which comprises two fixed hollow substantially cylindrical barrels 16 which come in axial alignment. The open ends of these barrels which come adjacent have a gap between them in which is located a two-part clamping member 17 and 18 formed with means for holding a nut blank 20 in a defined position. This clamping means is of substantially usual type and is not shown in detail but is operated by a rod 21 the lower end of which is connected to the rear of a pedal lever 22 pivoted at 23 to the framework 14. When the pedal is depressed the clamping members 17 and 18 are adapted to grip the nut blank between them so that the axis of the bore is in alignment with the axis of the barrels 16.

A common driving shaft 24 is mounted in bearings in the body or framework 15 and extends across the rear of the machine and at one side has mounted thereon a driving pulley 25. Figs. 3, 4 and 5 only show one barrel portion 16, but it should be understood that an exactly similar but handed barrel portion is provided in alignment therewith. On the shaft 24 within the casing 15 towards each end of the shaft a toothed pinion 26 is keyed.

Within each barrel 16 is arranged a sliding sleeve 26 which carries on the interior a hollow spindle 27 by means of ball bearings 28 which enable the hollow spindle 27 to rotate in the sleeve 26. The hollow spindle at one end is reduced and passes out through the aperture formed in an inwardly projecting flange at one end of the sliding sleeve 26, and has keyed thereto a toothed wheel 29 which meshes with the toothed pinion 26ª. The sleeves 26 can slide without rotating in the barrels 16 through a limited distance and as shown in Figs. 3, 4 and 5, in whatever position the sleeves come in the barrels, the gear wheels 29 are in mesh with the pinions 26ª.

The sliding sleeves 26 are caused to slide in the barrels in opposite directions, that is to say the sleeves are moved towards or away from each other. The means for effecting this purpose comprises toothed rack-like portions 30 on the undersides of the sleeves 26 and shown diagrammatically in Fig. 1 with the teeth of which, toothed quadrants 31 engage. These toothed quadrants are mounted upon spindles 32 suitably supported in the framework of the machine. On these spindles 32 other toothed quadrants 33 are also mounted. These quadrants 33 are of such size and disposition that their teeth engage as shown in Fig. 1. 34 are links pivotally connected to the quadrants 33 at one end and at the other end connected together and to a rod 35, the other end of which is connected to the pedal 22. In the position of the parts shown in Fig. 1, the pedal 22 has been depressed and the toothed quadrants so operated that the sliding sleeves 26 have been moved towards each other and actually occupy the position shown in Fig. 3. Springs 36 are provided attached at one end to some suitable fixed portion of the framework and at the other end to the quadrant levers 33 so that when the pressure of the foot is removed from the pedal 22, the springs perform the return action and cause the sliding sleeves 26 to be moved apart by means of the quadrants 31, to the position of the parts shown in Fig. 5.

The action of the pedal 22 and associated parts is such that when it is first depressed the nut blank is clamped firmly in position and held during the subsequent movements of the sleeves 26.

Upon the inner end of each hollow spindle 26 is arranged a sliding tool holder 37 the slideway 38 coming at 45 degrees to the center line of the spindle 26 and in such a manner that when the spindle is advanced towards the nut blank 20 and the sliding tool holder 37 is arrested from further longitudinal movement with the spindle 26, it immediately slides parallel to, or in, or on the obstruction which is arresting the motion forward. The necessary obstruction is arranged for the tool holder 37 by means of an axle or rod 39 centrally located in the spindle 26 which spindle is formed hollow for the purpose. This axle or rod 39 is arrested at the back end of the spindle by any suitable adjustable stops such as the nuts 40 co-acting with the bearing 41, and so disposed that upon the spindle 26 being moved forward beyond a certain point to any required distance, the axle 39 is arrested from forward motion and a portion thereof for instance an inclined or other bore 42 therethrough at the forward end forms the necessary obstruction to cause the tool box or holder 37 to be arrested and to slide radially and parallel to the said obstruction.

In order that the angle of feed of the tools 44 shall be parallel to the surface of the V or other groove or recess to be formed, the obstruction constituted by the forward portion of the axle or rod 39 has co-operating therewith a hardened plug or pin 43 which is attached to the tool box 37 and passes through the angularly or otherwise arranged bore 42 in the end of the axle or rod 39. The angular inclination of this bore 42 and pin 43 is such that it is parallel to the side of the V or other groove to be formed and the axis passes across the axis of the spindle 39. The angle may be varied to suit requirements according to the inclination of the surface of the V or other groove.

Figure 7:
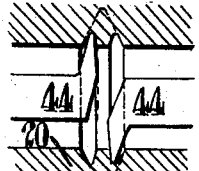
Figure 8:
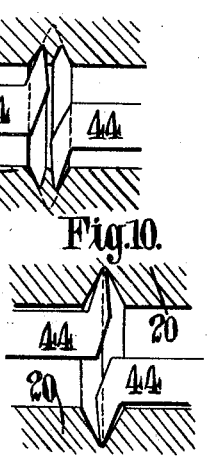
Figures 9, 10:
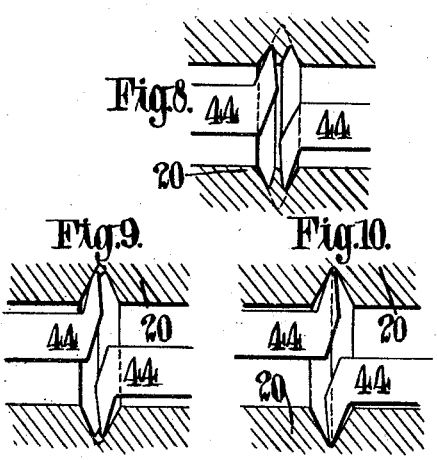
Figure 2:
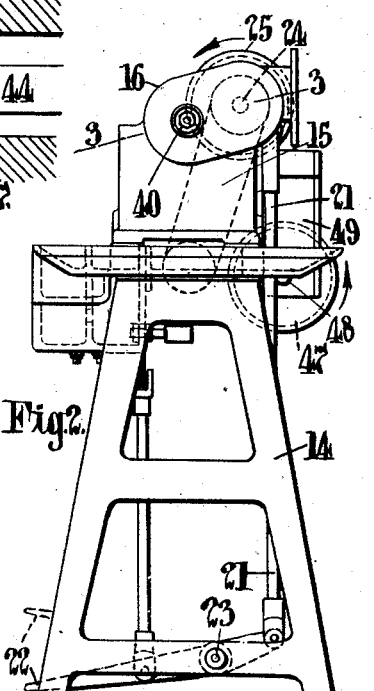
Fig. 2 shows a side elevation of Fig. 1.

Both spindles 27 have similar mechanism to that above described and it is obvious that when they are both advanced, that is moved towards each other, by their interconnecting mechanism as before explained, the obstruction carrying axles or rods 39 will be arrested at the same time to cause the two tool holders 37 to move radially at the same moment and each at the correct angle necessary to cut its particular surface of the V groove. The cutting of each surface of the groove thus takes place simultaneously until the two tools reach the required depth, that is when they form the apex of the V, in the case of a V groove, at which moment a permanent stop or stops are arranged to prevent further movement of the sleeves 26 and thus prevent further radial action of the cutting tools. It should of course be understood that the widths of the cutting tools relatively to the maximum width of the V recess or groove are so chosen that when the tools are employed in forming the two surfaces of the V or other groove they are simultaneously removing the whole or a part of the material from the recess or groove or substantially the whole of the material as shown in Figs. 7, 8 and 9 and when they reach the ends of their paths, Figs. 3 and 10, the whole of the material in such groove or recess has been removed.

Spring means are provided for returning the recessing tools 44 to their central positions (Figs. 4 and 6) to enable them to be withdrawn from the bore in the nut blank (Fig. 5). For this purpose each axle or rod 39 controlling the radial movements of a recessing tool is surrounded in a suitable position within the associated hollow spindle 27 by a helical compression spring 45 bearing at one end on an abutment on the axle or rod 39 and at the other end on an abutment in the hollow spindle 27. When the tool box 37 is held from further forward movement during the forward movement of the spindle 27 in the manner hereinbefore explained and represented in Fig. 4, the compression spring 45 is compressed by the continued forward action of the spindle until the position shown in Fig. 3 is attained. As a consequence, when the spindle 27 returns, the compression spring 45 holds the tool box 37 in the forward position for a period and at the same time the tool box slides radially and brings the tool towards the center and out of the V groove or recess. Upon the completion of this action the position shown in Fig. 4 is reached and the dimensions and disposition of the parts is such that the tool box 37 is drawn back with the spindle 27.

The nut blank 20 in Figs. 3, 4 and 5 is held in a fixed position by means of the clamping parts 17 and 18, not shown in these figures. The shaft 24 is constantly rotated by the pulley 25 and this causes the pinions 26ª to turn the gear wheels 29 and thus to keep the spindles 26 constantly rotating in the same direction.

The gears 26ª and 29 are so intermeshed and the parts are so disposed that the cutting portions of the tools 44 come 180 degrees apart and the gear wheels are of such size that this spacing remains constant. It should also be fully understood that the sleeves 26 do not rotate but are fed forward by means of the racks 30 on their undersides, and that the spindles 27 are constantly rotated by the gear wheels 29.

With the position of the parts shown in Fig. 5 the nut is placed in position and the first movement of the pedal 22 clamps it in this position. Continued movement of this pedal 22 causes the sleeves 26 to be moved towards each other and brings the parts into the position shown in Fig. 4 where it will be seen that the tools 44 come within the bore of the blank 20. In this position also the stops formed by the nuts 40 come into contact with the ball bearings 41 and thus are in position to prevent the axles or rods 39 from having further longitudinal movement. Continued pressure on the pedal 22 causes the sleeves 26 to be slidden still further, but as the pegs or pins 43 hold the tool holders 37 from direct forward movement owing to their engagement in the bores 42 in the axles or rods 39, the tool holders can only move in a direction permitted by the pins 43 sliding in the bores 42. Upon further movement of the sleeves 26 therefore they cause their associated spindles 27 to move towards each other and at the same time the tool holders move outwards by their pins 43 sliding in the bores 42 and themselves slide in the slideways 38 on the ends of the spindles 27. The inclination of the pins 43 and bores 42 is parallel to the sides of the V groove to be cut and as a consequence the cutting portions of the tools move parallel thereto and thus cut the annular V groove.

Figure 6:
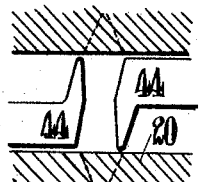
Figs. 6 to 10 show diagrammatic views illustrating the actions of the tools on the blank in five different stages of the cutting operation.

Fig. 6 represents the position of the tools just before the cutting operation, that is when the parts are in the position shown in Fig. 4. Fig. 10 shows the position of the tools at the end of the cutting operation, that is when the parts are in the position shown in Fig. 3, whilst Figs. 7, 8 and 9 show intermediate positions of the cutting operation.

To prevent too heavy a feed being imparted to the tools 44, any suitable governing device may be provided which will allow a tool feed below and up to a certain maximum, but which will retard the action, if the feeding pressure is too great. In this manner although the foot pressure on the pedal 22 may be too great or applied too suddenly yet the cutting tools will not be damaged.

One form of governing device for the purpose is shown in Figs. 1, 2, 11 and 12 and comprises a pulley 47 driven at a desired speed and mounted on a shaft 48 which passes into a casing 49 at the rear of the machine. On the shaft within the casing is mounted a worm 50. This meshes with a worm wheel 51 concentric with one of the spindles 32 but loosely mounted to turn freely in a projecting boss 52 of the casing 49. Whilst the machine is running, therefore, the worm wheel is caused to turn at a definite uniform speed which governs the maximum permissible tool feed in the following manner.

The outer face of the worm wheel 51 is recessed and has mounted therein a disc member 53, formed with a sleeve or boss loosely mounted on the spindle 32. A tension spring 54 connects the disc 53 to a suitable part of the casing 49 as shown in Fig. 11. Free wheel pawls and teeth, or balls and recesses 55 are also provided between the worm wheel 51 and disc 53, so located and arranged that the worm wheel can rotate freely in the direction of the arrow 56, Fig. 11, that is the direction in which it is driven, without taking the disc 53 with it. The disc 53 has a projecting pin 57 which normally comes against the end of an adjustable stop 58 and thus the disc 53 is normally held by its associated spring 54 with the pin 57 pressed against the stop 58.

On the spindle 32 is keyed a lever arm 59 which comes within the casing 49 and works between adjustable stops 60 carried by the casing 49. This lever 59 when moved by the depression of the pedal 22, moves towards the projecting pin 57. It makes contact with this pin 57 and carries it along with it. This causes the disc 53 to be turned in the direction of the arrow 56. If the rate of turning of the disc 53 is less than that of the worm wheel 51 the feed imparted to the tool, through the quadrants 31 and the racks 30, is less than the maximum. If the movement given to the lever 59 would, if free to do so, turn the disc 53 faster than the worm wheel 51, then the disc 53 in trying to turn faster than the worm wheel causes the free wheel pawls or balls 55 to engage with the wheel 51 and the disc 53 is only allowed to move with the wheel 51. This imparts the maximum desirable feed to the cutting tools.

When pressure is removed from the pedal 22 the lever 59 returns to its original position (Fig. 11) and allows the disc 53 also to be returned by the spring 54.

Although a simple machine for receiving and holding nut blanks to have the internal V or other groove cut therein has been particularly described and illustrated, it is of course obvious that the operation performed in this machine may be one of the operations to be carried into effect on a wholly automatic machine and the means for effecting the operation can be combined in the automatic machine with suitable modifications.

Any suitable lubricating system can be incorporated in machines constructed according to the invention, for instance the cutting tools can be lubricated by slurry as is common practice on machine tools by a circulating pump driven from a countershaft in any suitable position.

Although machine tools have been described in which the tools rotate whilst the workpiece is held fixed, it is of course obvious that the work piece may be rotated whilst the tools remain fixed, except for the feed motion imparted thereto in some cases. Both the work piece and the tools in further forms of the machine can be rotated and in opposite directions.

Whilst machines constructed according to the invention are particularly suitable for producing annular V grooves in internal bores, it is obvious that grooves of any other desired and suitable section may be produced, for example U or channel section grooves or undercut V grooves substantially dove-tailed in cross section.

The invention is not limited to the particular constructional forms or precise details of construction described as these may be varied to suit particular cases.

Having now particularly described and ascertained the nature of my said invention and in what manner the same is to be performed, I declare that what I claim is:—

1. Machine tools for the production of annular grooves or recesses of desired shape in cross section, in an internal bore, comprising means for holding a bored blank, means for passing two separate cutting tools into the bore, one from each end, means for effecting relative rotation between the tools and blank means for maintaining the tools spaced a desired angular distance apart, and means for imparting to each tool a cutting feed in a direction parallel to one side of the groove to be produced in such a manner that one tool cuts one surface of the groove while the other tool cuts the other surface, the tools being so shaped, proportioned and arranged that their combined actions produce the complete groove.

2. Machine tools as claimed in claim 1, comprising spindles for carrying the cutting tools into the bore from opposite ends, means for rotating said spindles in the same direction and at the same speed, and means for moving said spindles axially in opposite directions, in which each spindle has slidably mounted at the end thereof a tool holder for carrying the associated tool, and in which stop means are provided for moving the tool holder relative to the spindle.

3. Machine tools as claimed in claim 1, comprising spindles for carrying the cutting tools into the bore from opposite ends, means for rotating said spindles in the same direction and at the same speed, and means for moving said spindles axially in opposite directions, including a tool holder mounted on a slideway coming at 45 degrees or other suitable angle to the center line of said spindle and also including a stop all arranged in such a manner that when the spindle is advanced towards the blank the sliding tool holder is arrested from further longitudinal movement by means of the stop, and upon continued movement of the spindle the tool holder slides parallel to, or in, or on the obstruction which arrests the motion forward.

4. Machine tools as claimed in claim 1, comprising spindles for carrying the cutting tools into the bore from opposite ends, means for rotating said spindles in the same direction and at the same speed, and means for moving said spindles axially in opposite directions, in which the tool holder is provided with a projecting portion engaging with and adapted to be guided by a member adapted to be held in a fixed position at a desired point in the longitudinal travel of each spindle.

5. Machine tools as claimed in claim 1, comprising spindles for carrying the cutting tools into the bore from opposite ends, means for rotating said spindles in the same direction and at the same speed, and means for moving said spindles axially in opposite directions, in which each spindle is formed hollow to accommodate an axle formed with guiding means for a projecting pin or the like attached to the tool holder, and in which means are provided for permitting the axle member to move with the spindle for a portion of its longitudinal movement and for holding it from further movement during the continuance of the longitudinal movement of the spindle.

6. Machine tools as claimed in claim 1, comprising spindles for carrying the cutting tools into the bore from opposite ends, means for rotating said spindles in the same direction and at the same speed, and means for moving said spindles axially in opposite directions, in which each spindle is hollow to accommodate an axle member and the latter is formed with a guideway parallel to the surface of the groove which the tool associated with the tool holder is adapted to cut, and in which the tool holder has a projecting pin which works in the said guideway and is given a corresponding inclination.

7. Machine tools as claimed in claim 1, in which means are provided for preventing the overfeeding of the tools comprising a stop member driven at a desired uniform speed to which the feeding means is automatically coupled when the feeding pressure reaches or tends to exceed the desired maximum.

8. Machine tools for the production of annular grooves or recesses of desired shape in cross section in an internal bore, as claimed in claim 1, comprising spindles for carrying the cutting tools into the bore one from each end, means for rotating the spindles in the same direction and at the same speed and means for moving each spindle and its associated tool axially and in a direction opposite the other spindle and associated tool.

In witness whereof I affix my signature.

CHARLES GEORGE GARRARD.